United States Patent
Tuchman

Patent Number: 6,046,836
Date of Patent: Apr. 4, 2000

[54] LOW FREQUENCY OPTICAL SHUTTER

[75] Inventor: Israel Tuchman, Flushing, N.Y.

[73] Assignee: Electro-Optical Products Corporation, Fresh Meadows, N.Y.

[21] Appl. No.: 09/035,766

[22] Filed: Mar. 6, 1998

[51] Int. Cl.[7] .................................................. G02B 26/02
[52] U.S. Cl. .......................... 359/230; 359/227; 359/233; 359/234; 359/236
[58] Field of Search ..................................... 359/227, 230, 359/232, 233, 234–236, 889, 350, 353, 355–361, 237, 238; 396/461, 463, 469; 399/207

[56] References Cited

U.S. PATENT DOCUMENTS

| | | |
|---|---|---|
| 3,897,153 | 7/1975 | Keenan et al. .......................... 359/233 |
| 4,118,619 | 10/1978 | McArthur . |
| 4,168,910 | 9/1979 | Barnard . |
| 4,499,362 | 2/1985 | Martin . |
| 4,640,580 | 2/1987 | Schlesinger . |
| 4,907,895 | 3/1990 | Everest . |
| 5,055,673 | 10/1991 | Schneider . |
| 5,189,356 | 2/1993 | Rovner . |
| 5,280,163 | 1/1994 | Barkan . |
| 5,299,053 | 3/1994 | Kleinburg et al. ....................... 359/233 |
| 5,535,293 | 7/1996 | Buchin . |

Primary Examiner—James Phan
Attorney, Agent, or Firm—Holland & Hart LLP

[57] ABSTRACT

An optical shutter comprising a frame with an aperture and shutter blade for modulating a light beam or a particle stream passing through the aperture. The top end of the shutter blade comprises a first sector and a second sector, each sector having different optical characteristics. The bottom end of the shutter blade is coupled to a motor for pivotally rotating the shutter blade over a limited angular range in a clockwise and counter-clockwise direction such that the first sector is aligned with the aperture when the shutter blade is rotated in one direction and the second sector is aligned with the aperture when the shutter blade is rotated in the other direction.

14 Claims, 4 Drawing Sheets

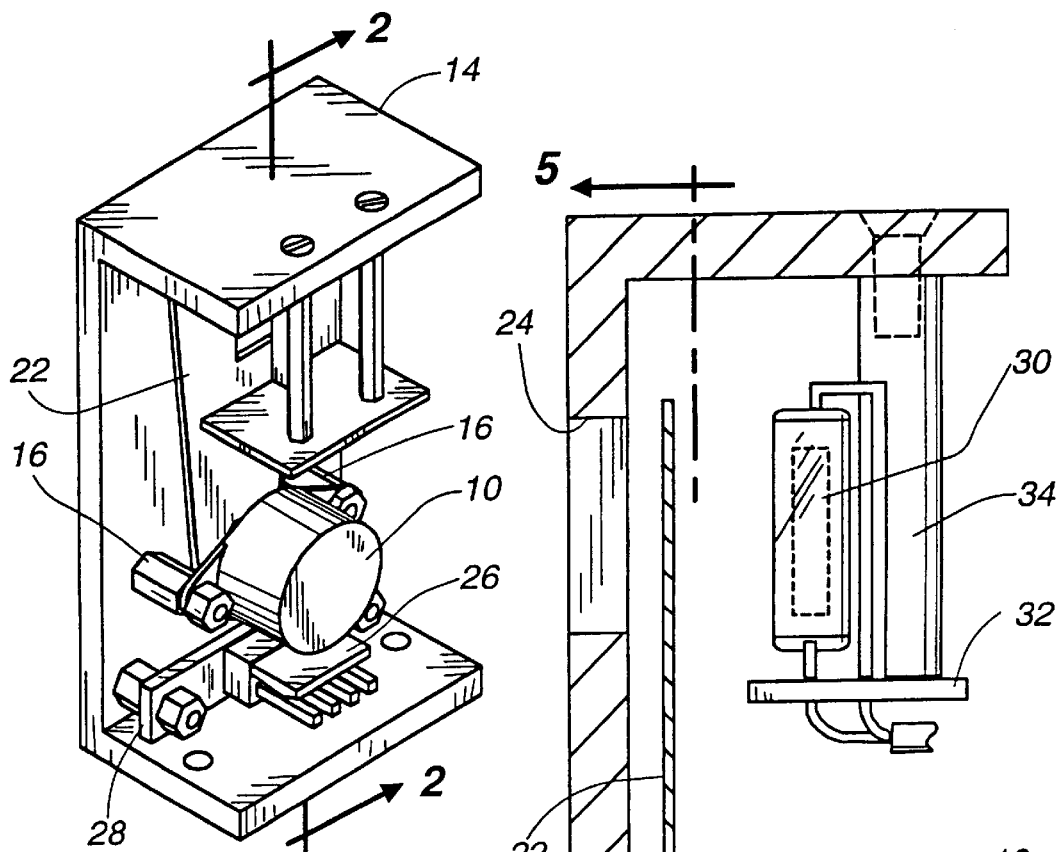
Fig. 1
Fig. 2
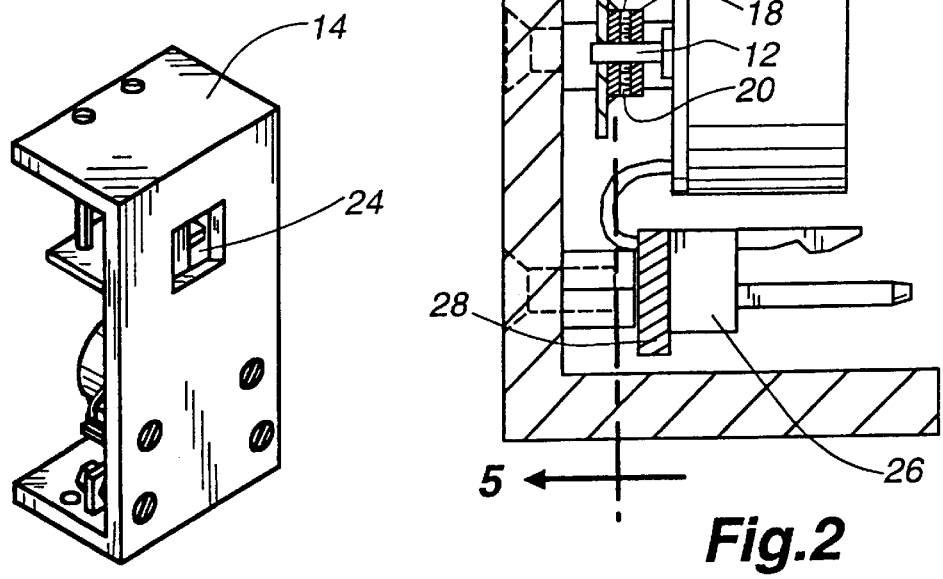
Fig. 3

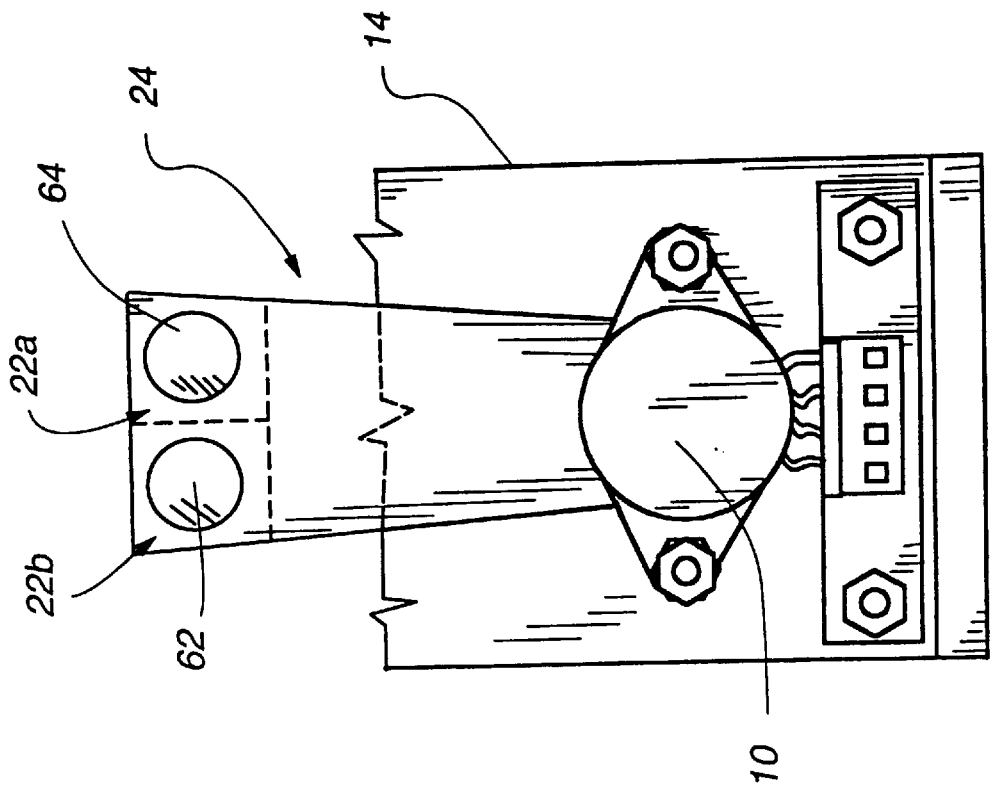
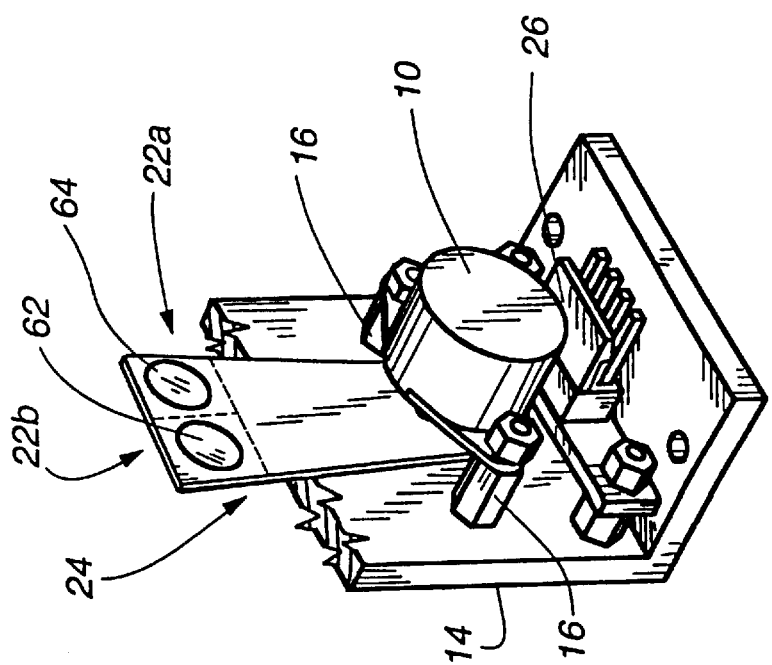

LOW FREQUENCY OPTICAL SHUTTER

BACKGROUND

Many applications require signal measurement in environments with high ambient noise levels. For example, telescopes which determine the temperature of objects at great distances typically measure small amounts infrared energy in high ambient noise environments. An effective method of filtering a signal in low signal to noise ratio environments is by modulating the measured signal and passing it to a locking amplifier. The measured signal can then be isolated from the ambient noise using synchronous detection techniques.

Optical shutters, also referred to as choppers, are used to modulate optical beams or particle streams. By modulating optical beams or particle streams, optical shutters allow these signals to be measured accurately in environments with high ambient noise.

One type of optical shutter developed to modulate optical beams or particle streams uses a disk with a predetermined pattern of apertures and opaque portions. A motor is used to rotate the disk so that a beam passing through the apertures is interrupted at a desired modulation frequency. Shutters utilizing a rotating disk, however, have limitations which are important to overcome.

Many applications take a longer time to make optical/particle measurements. These applications require the rotating disk shutter to rotate at low speeds. One way to operate a motor at low speeds is to decrease the current to the motor. Motors operating at low current have less torque, so that any intermittent friction within the motor affects the modulation frequency. Changes in the modulating frequency, called "jitter", over a measurement cycle introduce error to the measured signal.

Another source of jitter for rotating disk shutters comes from small differences between the sizes of each aperture on the disk. These differences translate to slight changes in the modulating frequency. Shutter disks which produce very little jitter are often expensive to manufacture.

Finally, some applications require the ability to stop the shutter disk at a point where the beam is passing through an aperture, or an "open" position. Conversely, some applications require the ability to stop the shutter disk at an opaque or "closed" position. This feature is difficult to produce in rotating disk shutters.

For the foregoing reasons, there is a need for an inexpensive optical shutter capable of modulating light beams or particle streams at low frequencies. There is also a need for an inexpensive optical shutter which is jitter free. Finally, there is a need for an inexpensive optical shutter that can be positioned at an open or closed position.

SUMMARY

The present invention is directed to an optical shutter that satisfies these needs. An optical shutter having features of the invention comprises a frame with an aperture and shutter blade for modulating a light beam or a particle stream passing through the aperture. The top end of the shutter blade comprises a first sector and a second sector, each sector having different optical characteristics. For example, one sector may be cut out and the other sector may be reflective. The bottom end of the shutter blade is coupled to a motor means for pivotally rotating the shutter blade over a limited angular range in a clockwise and counter-clockwise direction such that the first sector is aligned with the aperture when the shutter blade is rotated in one direction and the second sector is aligned with the aperture when the shutter blade is rotated in the other direction.

A driver circuit for the optical shutter having a motor means with a phase one coil set and a phase two coil set comprises a means for supplying current through the phase one coil set to ground, a clock means for providing the operating frequency and phase of the optical shutter, and a amplifier means for providing current through the phase two coil set to ground in response to the clock means.

DRAWINGS

These and other features, aspects, and advantages of the present invention will become better understood with regard to the following description, appended claims, and accompanying drawings where:

FIG. 1 shows a rear perspective view of the optical shutter according to the invention.

FIG. 2 shows a cross-sectional view of the optical shutter according to the invention taken along the section line 2—2 of FIG. 1.

FIG. 3 shows a front perspective view of the optical shutter according to the invention.

FIG. 7 shows perspective view of an alternate embodiment of the optical shutter with an optical filter at each sector of the shutter blade.

FIG. 8 shows a rear elevation view the optical shutter with an optical filter at each sector of the shutter blade.

DESCRIPTION

Figure 4:
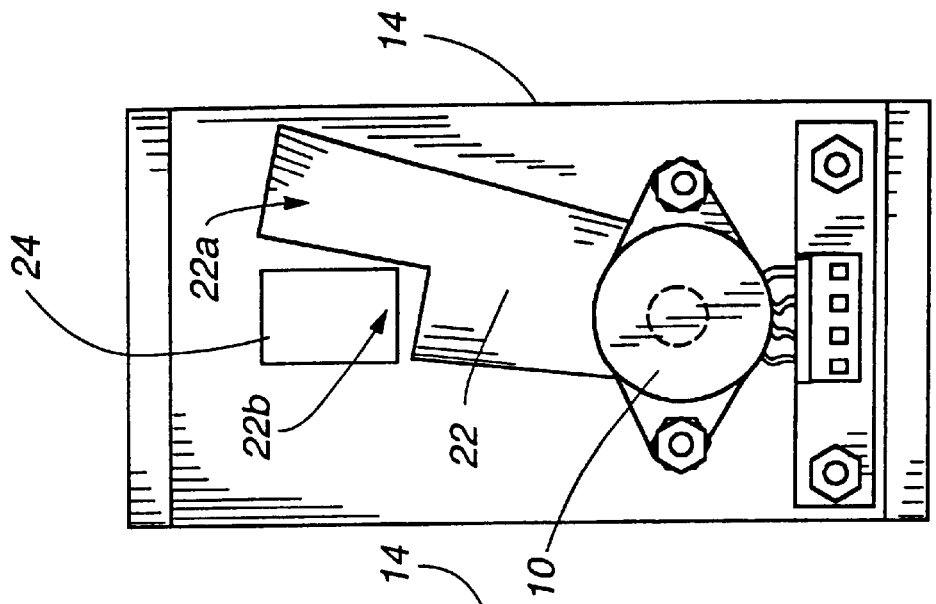
FIG. 4 shows a front cross-sectional view of the optical shutter in a closed position according to the invention.

A detailed description of the construction and use of the invention is given below, with reference being made to the drawings, wherein the same reference numbers are utilized throughout to refer to common elements.

A perspective view of the optical shutter is shown in FIG. 1 and FIG. 3. FIG. 2 shows a cross-sectional view of the shutter taken along the section line 2—2 of FIG. 1. A stepping motor 10, comprising of a shaft 12, is mounted on a frame 14 using two spacers 16. A blade holder 18 is adjustably mounted to the shaft 12 using fasteners such as two set screws 20. A shutter blade 22 is coupled to the blade holder 18 using an adhesive such as epoxy, or alternatively by other bonding or fastening means. The shutter blade 22 extends from the blade holder 18 to an aperture 24 on the frame 14. A connector 26 is mounted on the frame 14 using a connector mount 28. The connector 26 electrically connects the stepping motor 10 to a shutter driver.

Figure 5:
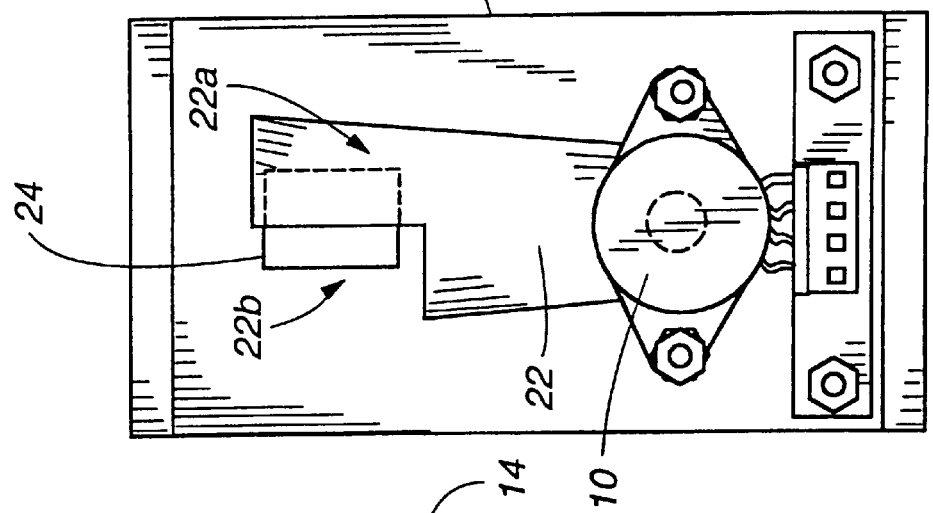
FIG. 5 shows a cross-sectional view of the optical shutter motor and optical shutter driver according to the invention taken along the section line 5—5 of FIG. 2.

FIG. 5, a cross-sectional view taken along the section line 5—5 of FIG. 2 is shown. This figure shows more clearly the V-shaped shutter blade 22 having a first sector 22a and a second sector 22b. The base of the shutter blade 22, being coupled to the blade holder 18, can thus pivotally rotate about the shaft 12.

Figure 6:
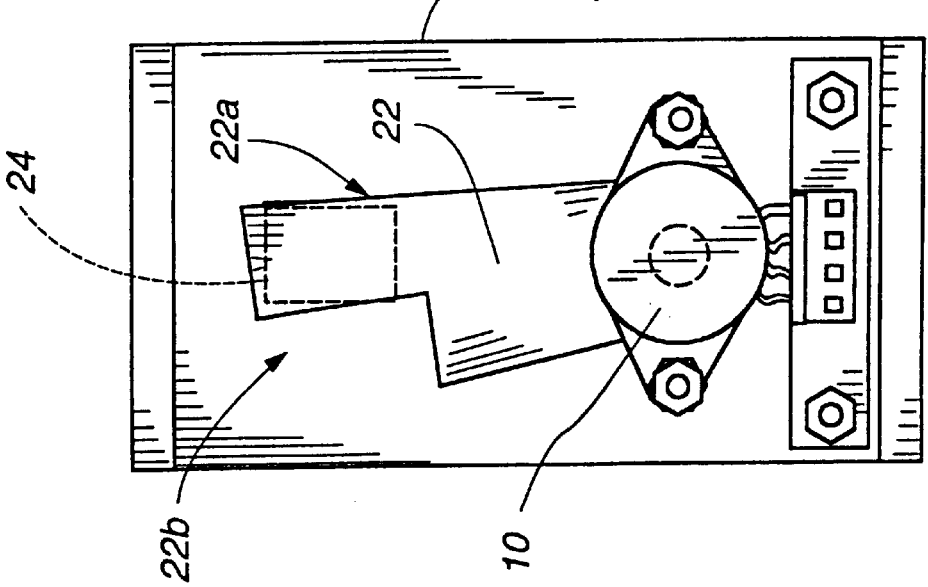
FIG. 6 shows a cross-sectional view of the optical shutter in an open position.

The shutter blade 22 is constructed such that when it rotates counter-clockwise to a "closed" position, a light beam or particle stream passing through the aperture 24 is obstructed by the first sector 22a. FIG. 4 shows the shutter blade 22 in a closed position, where the first sector 22a is aligned with the aperture 24. Conversely, when the shutter blade 22 rotates clockwise to an "open" position, a light beam or particle stream passing through the aperture 24 and is unobstructed by the shutter blade 22. FIG. 6 shows the shutter blade 22 in a open position, where the second sector 22b is aligned with the aperture 24. The set screws 20 allow the shutter blade mounting position to be aligned so that the aperture 24 is completely obstructed when the shutter blade 22 rotates to its closed position, and completely unobstructed when the shutter blade 22 rotates to its open position.

The optical shutter modulates a light beam or a particle stream passing through its aperture 24 by repeatedly rotating the shutter blade 22 from the closed position to the open position and vice-versa. The stepping motor 10 actuates the shutter blade motion through the use of the shutter driver, which is described in detail below.

The two spacers 16, in addition to mounting the stepping motor 10, function as physical stops limiting the shutter blade's rotation angle in both the clockwise and counterclockwise directions. If the shutter blade 22 travels too far in either direction, it hits a spacer 16 and is physically prevented from traveling any further in that direction.

The shutter blade surface can be reflective or non-reflective. For example, a shutter blade 22 can be polished and plated with either silver or gold for a reflective surface. A shutter blade 22 which is black anodized can be used for a non-reflective surface.

The optical shutter may also comprise of a infrared emitter 30, as shown in FIG. 2. The infrared emitter 30 is mounted behind the aperture 24 and shutter blade 22 using an emitter board 32 and an emitter mount 34. The connector 26 electrically connects the infrared emitter 30 to a power source.

Figure 9:
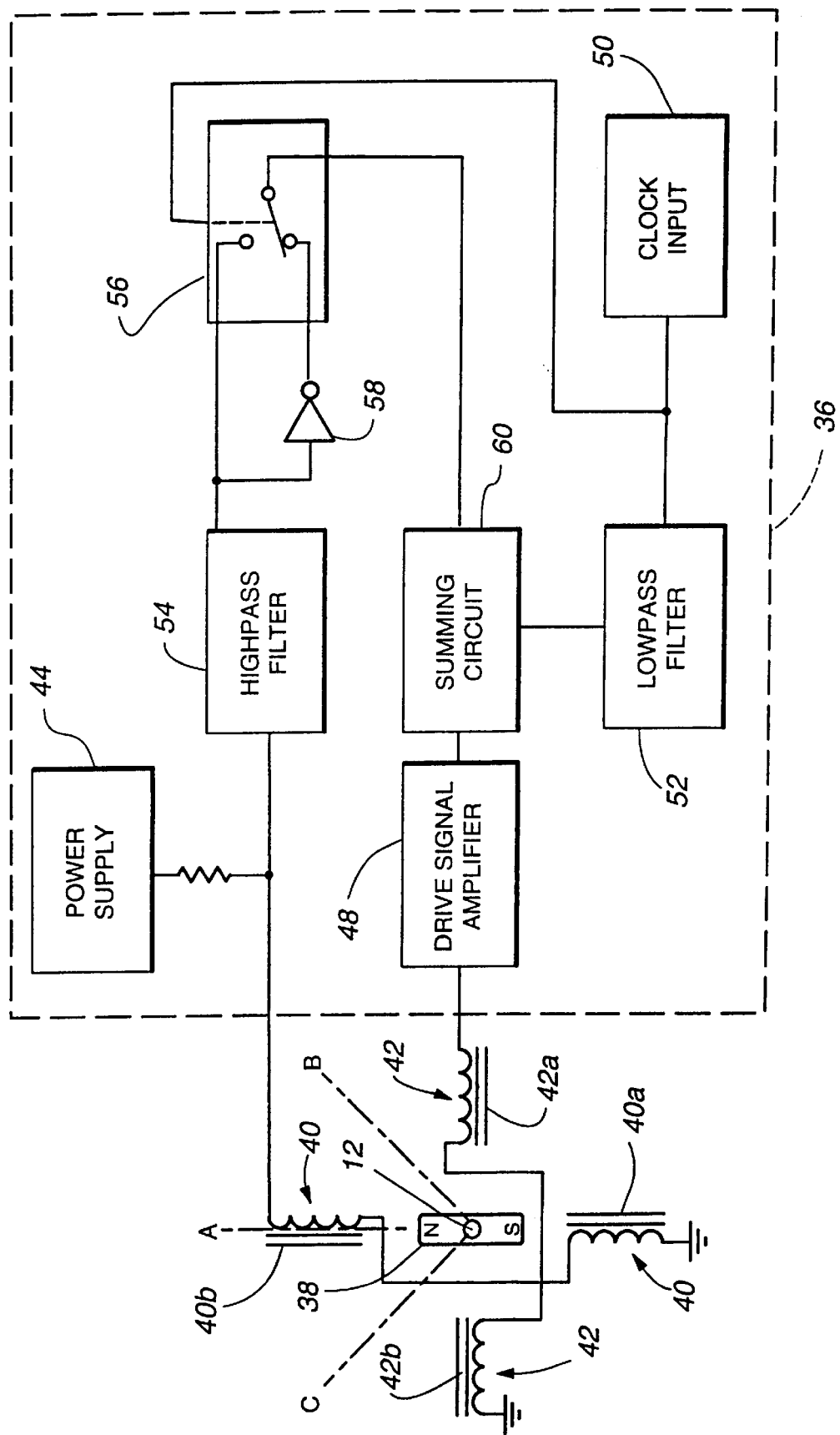
FIG. 9 shows a block schematic diagram of the optical shutter motor and optical shutter driver according to the invention.

FIG. 9 shows a schematic diagram of the stepping motor 10 and the shutter driver 36. It should be noted that although a two phase four pole stepping motor is shown, stepping motors with a greater number of poles can be used. The stepping motor 10 comprises of a rotor 38 and the shaft 12. The stepping motor 10 also comprises of two sets of four poles, a phase one pole set 40 and a phase two pole set 42.

A first set of poles 40a and 40b connected in series make up the phase one pole set 40. A power supply 44 in series with a current limiter 46 supplies current through the phase one pole set 40 to ground. The resulting magnetic force causes the rotor 38 to line up with the phase one pole set 40 and move to position A.

A second set of poles 42a and 42b make up the phase two pole set 42. The phase two pole set 42 is connected in series to ground. Current in either a positive or negative direction supplied to the phase two pole set 42 creates a magnetic lateral force rotating the rotor 38 away from position A and towards either position B or position C. Whether the rotor 38 rotates towards position B or position C depends on which of the second set of poles 42a or 42b is attracting and which is repelling the rotor 38.

A drive signal amplifier 48 is used to supply current to the phase two pole set 42. The drive signal amplifier 48 includes two power op-amps arranged as a bridge amplifier. The drive signal amplifier 48 is connected in series with the phase two pole set 42 to ground. Thus, the drive signal amplifier 48 sinks and sources bi-directional current to the phase two pole set 42 from ground.

As current is modulated from positive to negative through the phase two pole set 42, the rotor 38 swings back and forth between position B and position C. The rotor 38, being coupled to the shutter blade 22 through the shaft 12 and blade holder 18, causes the shutter blade 22 to also swing back and forth between position B and position C. Assuming position B represents the optical shutter's open position and position C represents the optical shutter's closed position, the aperture 24 will therefore open and close as current is modulated from positive to negative through the phase two pole set 42. The two spacers 16 prevent the stepping motor 10 from turning more than a half step by physically stopping the shutter blade 22 if it swings too far in either direction.

The stepping motor 10 swings the shutter blade 22 back and forth at a rate determined by a square wave clock input 50. The clock input frequency is set by the user. An internal oscillator can be utilized to generate the square wave clock input frequency, or alternatively, the clock input frequency can be supplied from an external source.

The clock input frequency will typically vary from DC up to the resonant frequency of the optical shutter. The optical shutter resonant frequency is a function of the motor torque and the mass of the moving parts.

The mass of the moving parts also produces an undesirable "ringing" in the optical shutter. Ringing occurs when the shutter blade 22 overshoots the steady state rest positions B or C at the extremes of its travel and swings back to compensate. The shutter blade 22 pendulates back and forth around positions B or C until it finally subsides at the steady state position. In order to minimize shutter blade ringing, a low-pass filter 52 is placed after the clock input 50.

The low-pass filter 52 is constructed using an op-amp configured as an integrator. In this way, the shutter's motion is dampened by the low-pass filter 52 smoothes the transitions of the clock input 50 by transforming the square wave clock input into a trapezoidal output. This decreases shutter blade ringing by slowing down the shutter blade 22 as it moves from position B to position C and vice-versa.

To further decrease shutter blade ringing, the AC component of the voltage drop across the phase one pole set 40 is added to the low-pass filter 52 output. The AC component of the voltage drop across the phase one pole set 40 is isolated using a high-pass filter 54. The high-pass filter 54 may be constructed using a capacitor with one end connected to the input voltage and the other end connected to a resistor in series to ground. The filter output voltage is taken at the capacitor-resistor junction.

The output of the high-pass filter 54 is connected to an analog switch 56 input and an analog inverter 58 input. The analog switch 56 can be a solid state relay, such as the Aromat AQV214E. The analog inverter 58 is constructed using an op-amp configured to multiply its input by negative unity (−1). The analog inverter 58 output is also connected to the analog switch 56 input, so that the analog switch 56 output is either the inverted or non-inverted AC component of the voltage drop across the phase one pole set 40.

The clock input 50 signal selects whether the analog switch 56 outputs the inverted or non-inverted signal. The selected signal is added to the low-pass filter 52 output through an analog summer 60. The analog summer 60 can be constructed using an op-amp configured to place the sum two input signals on its output. The analog summer 60 output is passed to the drive signal amplifier 48, which drives the phase two pole set 42.

Although the present invention has been described in considerable detail with reference to certain preferred versions thereof, other versions are possible. For example, the optical shutter 22 may constructed such that the first sector 22a and the second sector 22b comprise optical filters 62 and 64 with each sector passing a different range of wavelengths of light, as shown in FIG. 7 and FIG. 8. Another example is constructing the optical shutter using two shutter blades 22 to open and close the aperture 24. Another example is adding a monitor output to the shutter driver 36 for the user to determine the position of the shutter blade 22. Therefore, the spirit and scope of the appended claims should not be limited to the description of the preferred versions contained herein.

The invention now being fully described, it will be apparent to one of ordinary skill in the art that any changes and modifications can be made thereto without departing from the spirit or scope of the invention as set forth in the appended claims.

I claim:

1. An optical shutter suitable for modulating a light beam, the optical shutter comprising:

(a) a frame having at least one aperture for passing a light beam through the frame;

(b) at least one shutter blade proximate the frame having a bottom end and a top end with the top end comprising of a first sector and a second sector and wherein the first sector has different optical properties than the second sector; and (c) a motor means for privotally rotating the shutter blade over a limited angular range in a clockwise and counter-clockwise direction such that the first sector is aligned with the aperture when the shutter blade is rotated in one direction and the second sector is aligned with the aperture when the shutter blade is rotated in the other direction; and (d) at least two spacers mounted on the frame such that the shutter blade is physically prevented by the spacers from pivoting past a position where the second sector is aligned the aperture in one direction, and pivoting past a position where the first sector is aligned with the aperture in the other direction.

2. The optical shutter of claim 1, wherein the motor means comprises of a stepper motor mounted to the frame, and the optical shutter further comprising:

(a) a shaft within the stepping motor rotatable about its longitudinal axis; and (b) a shutter blade holder adjustably mounted to the shaft and coupled to the shutter blade.

3. The optical shutter of claim 1, wherein the first sector includes an optical filter.

4. The optical shutter of claim 3, wherein the second sector includes an optical filter.

5. The optical shutter of claim 1, wherein the first sector is reflective.

6. The optical shutter of claim 1, wherein the first sector is non-reflective.

7. The optical shutter of claim 1, wherein the first sector is non-transparent and the second sector is transparent.

8. The optical shutter of claim 1, further comprising an infrared emitter mounted on the frame such that the top end of the shutter blade moves between the infrared emitter and the aperture.

9. The optical shutter of claim 1, further comprising a means for electrically connecting the optical shutter to a driver.

10. The optical shutter of claim 1, wherein the optical shutter comprises of one shutter blade.

11. The optical shutter of claim 1, wherein the optical shutter comprises of two shutter blades.

12. The optical shutter of claim 1, wherein the shutter blade is magnetically prevented from rotating past a position where the second sector is aligned with the aperture in one direction, and rotating past a position where the first sector is aligned with the aperture in the other direction.

13. The optical shutter of claim 1, wherein the limited angular range is less than 180 degrees.

14. An optical shutter suitable for modulating a light beam, the optical shutter comprising:

(a) a frame having at least one aperture for passing a light beam through the frame;

(b) at least one shutter blade proximate the frame having a bottom end and a top end with the top end comprising of a first sector and a second sector and wherein the first sector has different optical properties than the second sector;

(c) a motor means for privotally rotating the shutter blade over a limited angular range in a clockwise and counter-clockwise direction such that the first sector is aligned with the aperture when the shutter blade is rotated in one direction and the second sector is aligned with the aperture when the shutter blade is rotated in the other direction; and (d) an infrared emitter mounted on the frame such that the top end of the shutter blade moves between the infrared emitter and the aperture.

* * * * *